United States Patent [19]
Sano

[11] Patent Number: 5,474,368
[45] Date of Patent: Dec. 12, 1995

[54] ANTI-SKID BRAKING METHOD AND SYSTEM

[75] Inventor: Yoshiaki Sano, Okazaki, Japan

[73] Assignee: Mitsubishi Jidosha Kogyo Kabushiki Kaisha, Tokyo, Japan

[21] Appl. No.: 110,689

[22] Filed: Aug. 23, 1993

[30] Foreign Application Priority Data

Aug. 26, 1992 [JP] Japan .................................. 4-227027

[51] Int. Cl.$^6$ ...................................................... B60T 8/66
[52] U.S. Cl. ........................... 303/163; 303/146; 303/182
[58] Field of Search ............................... 303/100, 109, 303/107, 103; 364/426.02

[56] References Cited

U.S. PATENT DOCUMENTS

| | | | |
|---|---|---|---|
| 3,904,251 | 9/1975 | Hikida et al. | 188/181 C |
| 4,779,696 | 10/1988 | Harada et al. | 303/99 |
| 4,842,342 | 6/1989 | Takahashi et al. | |
| 5,210,690 | 5/1993 | Kageyama et al. | 303/109 |
| 5,210,693 | 5/1993 | Kuwana et al. | 303/95 |

FOREIGN PATENT DOCUMENTS

| | | |
|---|---|---|
| 0297485 | 1/1989 | European Pat. Off. |
| 1132450 | 5/1989 | Japan. |
| 1145255 | 6/1989 | Japan. |
| 292763 | 4/1990 | Japan. |

OTHER PUBLICATIONS

Proceedings IECON 87, vol. 2, Nov. 6, 1987, Cambridge, Mass., pp. 810–816, Matsumoto et al. "Expert Antiskid System".

Primary Examiner—Matthew C. Graham
Attorney, Agent, or Firm—Evenson, McKeown, Edwards & Lenahan

[57] ABSTRACT

An anti-skid braking method is provided for controlling, on the basis of a slip ratio of a wheel and an acceleration of the wheel, braking force to be applied to the wheel. The anti-skid braking method comprises the following steps: where the slip ratio is found to fall outside an appropriate range during slip ratio computation, adding differences between a limit defining the appropriate range and the respective slip ratio values so computed; and when the integral of the differences is at least equal to a predetermined value and the acceleration of the wheel is detected to be low, enhancing the control of the braking force, the control being performed based on the wheel acceleration and the slip ratio, so that the slip ratio is brought back into the appropriate range. An anti-skid braking system suitable for use in practicing the anti-skid braking method is also described.

14 Claims, 12 Drawing Sheets

FIG.15(a)
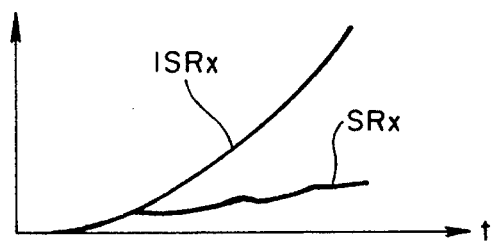
FIG.15(b)
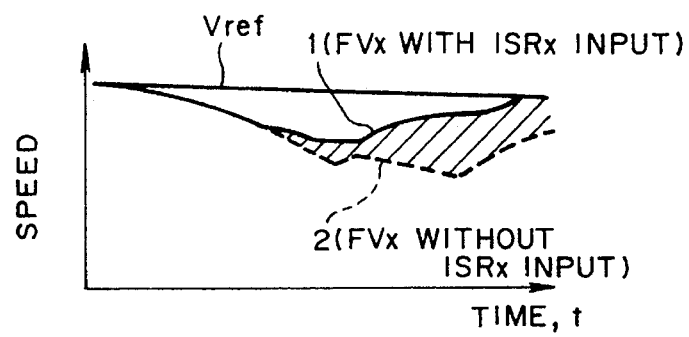
FIG.16(a)
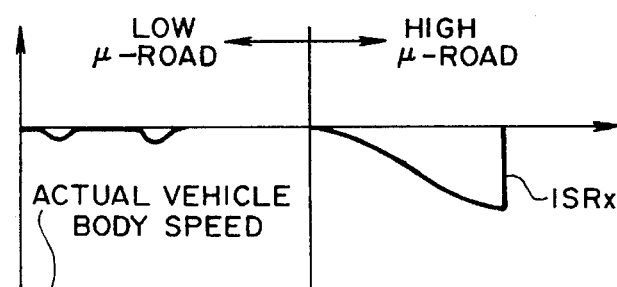
FIG.16(b)
FIG.16(c)
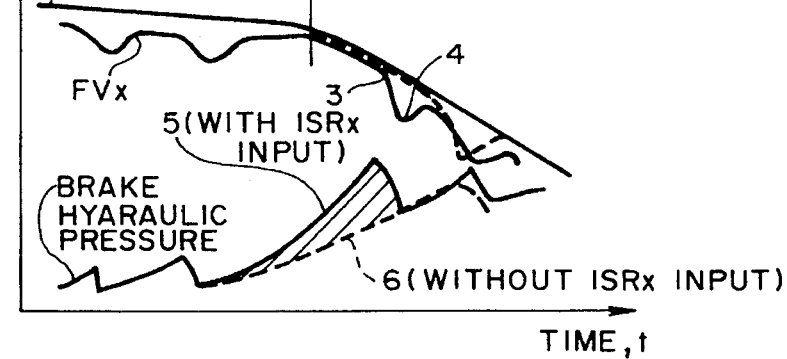

ANTI-SKID BRAKING METHOD AND SYSTEM

BACKGROUND OF THE INVENTION a) Field of the Invention

This invention relates to an anti-skid braking method suited for application to brakes of an automotive vehicle. This invention is also concerned with an anti-skid braking system suited for the practice of the anti-skid braking method.

b) Description of the Related Art

An anti-skid braking method is known, which upon braking on a low-μ road such as a rain-wet road, can prevent slipping of wheels, retain steerability and allow a vehicle to stop in a short stopping distance. According to this known braking method, the revolution speed of each wheel is detected to determine the speed of the wheel. Based on the difference between the speed of the wheel and a reference speed of the vehicle body, the slip ratio of the wheel is determined. Further, time-dependent variations of the speed of the wheel, namely, the wheel acceleration is also determined. In accordance with the slip ratio and wheel acceleration so determined, braking pressure for the wheel is then increased or decreased so that the slip ratio can be maintained near an optimal slip ratio at which the coefficient of friction of the wheel becomes the greatest.

The wheel acceleration can be used as a control parameter for determining whether the wheel is controlled toward a locked state (that is, tends to lock) or is controlled toward a brake-released state (that is, tends to be released from the brake) by the increase/decrease control of the brake pressure.

Upon running on an extremely low μ-road having a very small coefficient of friction, each wheel may be judged to be in a slightly decelerated state because of an acceleration of the wheel although the slip ratio of the wheel is greater than an optimal control range. The hydraulic brake pressure may therefore neither decrease nor increase or, even when controlled, is decreased only slightly. If such a state is permitted to remain as is without any control, the wheel is brought toward a locked state and eventually is locked. Such a state of the wheel, in which the wheel is gradually brought toward a locked state, involves the problem that it cannot be exactly detected as long as only the acceleration of the wheel is relied upon as in the conventional art.

When an automotive vehicle advances from a low-μ road having a low coefficient of friction to a high-μ road such as an asphalted road, the conventional increase/decrease control of the hydraulic brake pressure has a slow rise in longitudinal acceleration and also has difficulty in accurately detecting the advance to the high-μ road on the basis of a wheel acceleration. The conventional control is therefore accompanied by the problem that the pressure increase immediately after the advance is delayed and the application of brakes is delayed accordingly. Because of the slow rise in longitudinal acceleration, the driver feels as if the brakes are not effectively applied, in other words, the driver feels a so-called "idle-running". This is certainly undesirable.

SUMMARY OF THE INVENTION

An object of the present invention is to provide an anti-skid braking method, which can detect at an early stage the phenomenon that a wheel is gradually brought toward a locked state on an extremely low-μ road or an advance from a low-μ road to a high-μ road so that a delay in the control can be avoided and the braking performance can be improved. Another object of the present invention is to provide an anti-skid braking system suitable for use in the practice of the anti-skid braking method.

In a first aspect of the present invention, there is thus provided an anti-skid braking method for controlling, on the basis of a slip ratio of a wheel and an acceleration of the wheel, braking force to be applied to the wheel, which comprises the following steps:

where the slip ratio is found to fall outside an appropriate range during slip ratio computation, adding differences between a limit defining the appropriate range and the respective slip ratio values so computed; and when the integral of the differences is at least equal to a predetermined value and the acceleration of the wheel is detected to be low, enhancing the control of the braking force, the control being performed based on the wheel acceleration and the slip ratio, so that the slip ratio is brought back into the appropriate range.

In a second aspect of the present invention, there is also provided an anti-skid braking system having means for controlling, on the basis of a slip ratio of a wheel and an acceleration of the wheel, braking force to be applied to the wheel, wherein the control means comprises:

slip ratio integrating means for adding, where the slip ratio is found to fall outside an appropriate range during slip ratio computation, differences between a limit defining the appropriate range and the respective slip ratio values so computed; and braking force computing means for enhancing, when the integral of the differences is at least equal to a predetermined value and the acceleration of the wheel is detected to be low, the control of the braking force, the control being performed based on the wheel acceleration and the slip ratio, so that the slip ratio is brought back into the appropriate range.

According to the present invention, the integral so computed means the period during which the slip ratio falls outside the appropriate range and hence is controlled. A greater integral therefore means that a state in which the slip ratio is outside the appropriate range lasts longer. Where the wheel acceleration is small and the integral is equal to or greater than the predetermined value, the control of braking force on the basis of the wheel acceleration and the slip ratio is enhanced to bring the slip ratio back to the appropriate range so that the slip ratio of each wheel can be effectively maintained in the appropriate range. In other words, even if the wheels undergo variations in behavior too small to obtain good control results only from a slip ratio and a wheel acceleration at a momentary given time, the use of the above integral makes it possible to precisely determine the slip state of the wheels. This can avoid a delay in the control so that the braking performance can be improved.

As a preferred embodiment of the present invention, the appropriate range is defined by an upper limit and, when the integral is at least equal to the predetermined value, the control is enhanced to reduce the braking force. This makes it possible to detect at an early stage the phenomenon that the wheel is progressively brought toward a locked state on an extremely low-μ road, whereby a delay in the control can be avoided. When any one of the differences between the upper limit and the respective slip ratios exceeds the predetermined value, the predetermined value can be added in place of the difference. This makes it possible to prevent the integral from reaching the predetermined value at an early stage due to occurrence of an excessively large slip ratio. As a consequence, it is possible to precisely detect any situation under which the slip ratio continuously exceeds the appropriate range.

As another preferred embodiment, the appropriate range can be defined by a lower limit and, when the integral is at least equal to the predetermined value, the control can be enhanced to intensify the braking force. This makes it possible to detect an advance from a low μ-road to a high μ-road at an early stage and, hence, prevent a delay in the control.

As a further preferred embodiment, the integral can be set to zero when the slip ratio returns to the appropriate range. This makes it possible to effectively maintain the slip ratio within the appropriate range.

As a still further preferred embodiment, the respective goodnesses of fit of the slip ratio, the wheel acceleration and the integral as input variables to plural fuzzy rules can be computed on the basis of preset membership functions and, from the respective goodnesses of fit so computed, control values can be computed for the control of the braking force. This permits finer control so that the braking performance can be improved.

Other features of the present invention will become apparent from the following description.

BRIEF DESCRIPTION OF THE DRAWINGS

FIG. 15(a) is a diagrammatic representation of slip ratios SRx and slip ratio integrals ISRx as a function of time;

FIG. 15(b) is a diagram showing time-dependent variations of the reference vehicle body speed Vref and the wheel speed FVx in correspondence to FIG. 15(a), in which wheel speeds FVx obtained when control was performed by inputting the slip ratio integral ISRx are indicated by the solid curve while those obtained when control was performed without inputting the slip ratio integral SRx are shown by the dashed curve;

FIG. 16(a), FIG. 16(b) and FIG. 16(c) are diagrammatic representations showing slip ratio integrals ISRx, reference vehicle body speeds Vref and wheel speeds FVx, and hydraulic brake pressures, all as a function of time, respectively.

DETAILED DESCRIPTION OF THE INVENTION AND PREFERRED EMBODIMENTS

Some embodiments of the present invention will hereinafter be described with reference to the accompanying drawings.

System Outline

Figure 1:
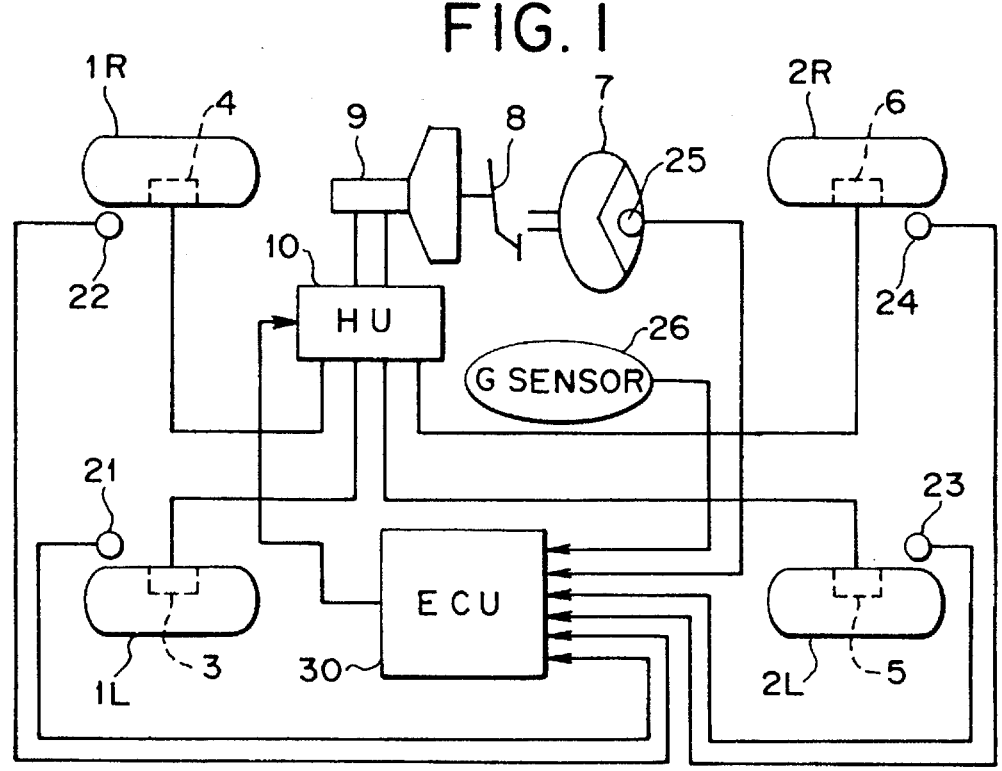
FIG. 1 is a block diagram showing the outline of the overall construction of an anti-skid braking system (hereinafter abbreviated as "ABS") to which the method of the present invention can be applied.

FIG. 1 illustrates the outline of an anti-skid braking system (ABS) of a vehicle. A motor directdrive hydraulic unit (HU) 10 is interposed between respective brakes 3–6 for front and rear, left and right wheels 1L,1R,2L,2R and a master cylinder 9 driven by a brake pedal 8. The wheels 1L,1R,2L,2R are provided with wheel speed sensors 21,22, 23,24, respectively, a steering wheel 7 with a steering angle sensor 25, and a vehicle body with an acceleration sensor (longitudinal G sensor) 26 for the detection of an acceleration in a longitudinal direction. These sensors 21–26 and hydraulic unit 10 are connected to an electronic control unit (ECU) (30). The ABS according to this embodiment is applied to a front-wheel-drive vehicle so that the rear wheels serve as non-driven wheels.

Figure 2:
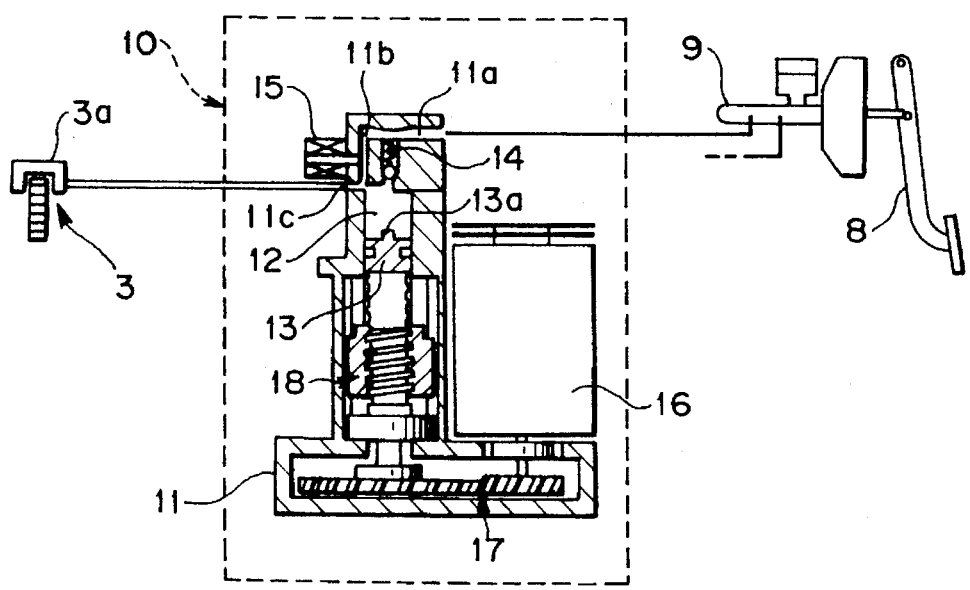
FIG. 2 is a hydraulic circuit diagram illustrating in more detail the construction of a hydraulic unit (HU) 10 shown in FIG. 1.

The hydraulic unit 10, as is shown in FIG. 2, has a cylinder 12 formed on a housing 11. A piston 13 is slidably fitted in the cylinder 12. In an upper part of the housing 11, passages 11a–11c are provided above the cylinder 12. An ABS check valve 14 is disposed between the passage 11a and the passage 11c, while an ABS cut-off valve 15 is arranged in the passage 11b provided alongside the check valve 14. The check valve 14 allows brake fluid to flow from a side of the passage 11c to a side of the passage 11a, and the cut-off valve 15 opens or closes the passage 11b. When the piston 13 reaches its upper-limit position, the check valve 14 is opened against a spring force by a pin 13a disposed on an upper end wall of the piston 13.

The housing 11 is provided with a motor 16. Drive torque of the motor 16 is transmitted to the piston 13 via a gear train 17 and a feed mechanism 18, whereby the piston 13 is driven. The motor 16, when rotated in a normal direction, rotates the feed mechanism 18 via the gear train 17 so that the piston 13 is caused to move upward. When reversed, the motor 16 however causes the piston 13 to move downward. The passage 11a in the housing 11 is connected to the master cylinder 9, whereas the passage 11c is connected to a wheel cylinder 3a of the brake 3. It is to be noted that the hydraulic unit 10 is shown only between the brake 3 for the front wheel 1L on one side of the vehicle and the master cylinder 9.

During braking, the electronic control unit 30 receives signals from the wheel speed sensors 21–24, the steering angle sensor 25 and the longitudinal acceleration (G) sensor 26 to predict how much the wheels 1L,1R,2L,2R would slip. To avoid locking of these wheels, the electronic control unit 30 controls the ABS cut-off valve and the motor 16, and hence the braking forces of the brakes 3–6. Described more specifically, when one or more of the wheels are expected to lock, each associated piston 13 is caused to move downward to decrease the pressure of the brake fluid to avoid such locking. When the danger of wheel locking is avoided, the piston 13 is allowed to move upward to again increase the pressure of the brake fluid. Such control is repeated so that the pressure of the brake fluid to be applied to the wheel cylinder 3a is controlled.

Procedures of ABS Control

A description will next be made of the procedures of the ABS control, which procedures are performed by the electronic control unit 30 of the ABS.

Figure 3:
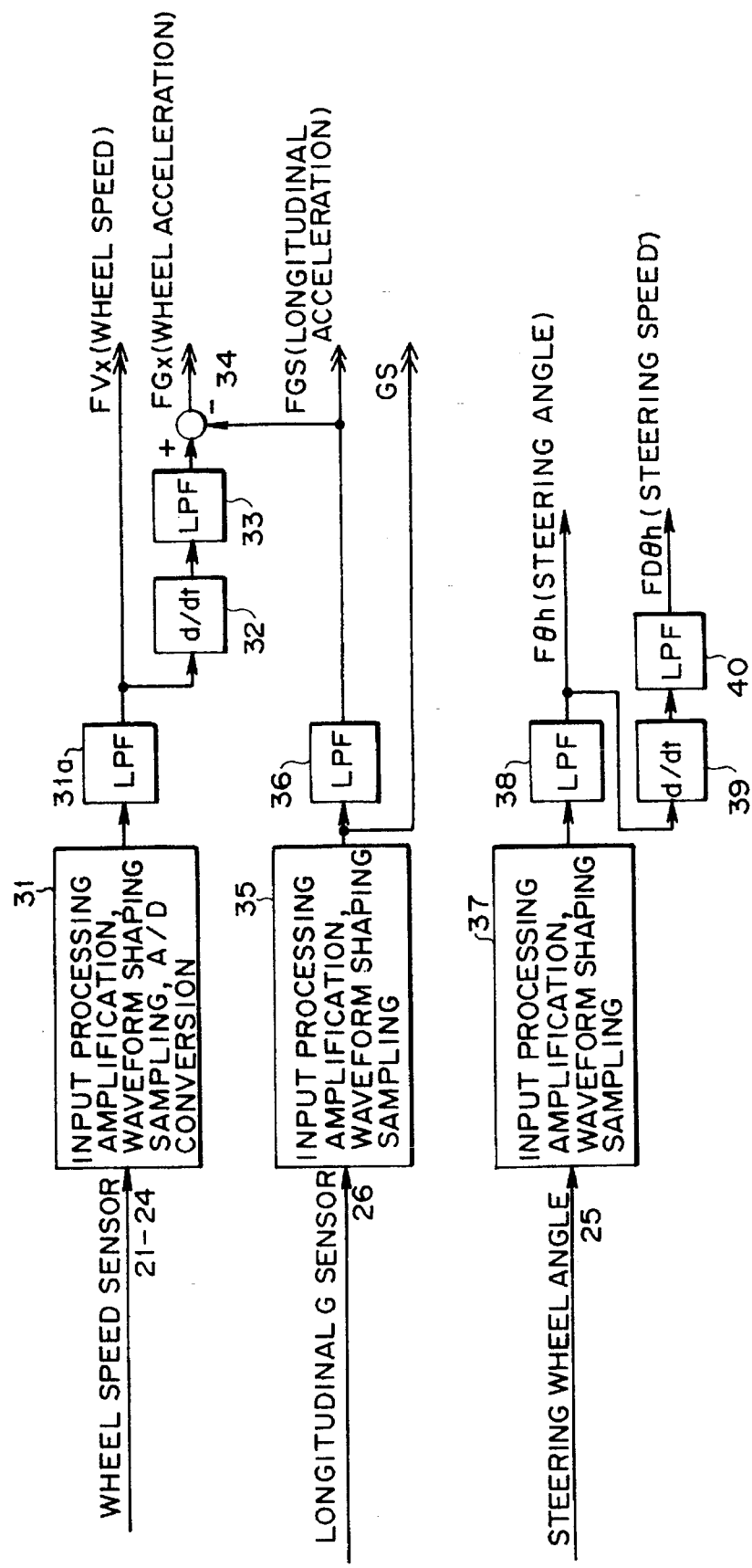
FIG. 3 is a functional block diagram of input signal processing by an electronic control unit (ECU) 30 shown in FIG. 1.
Figure 4:
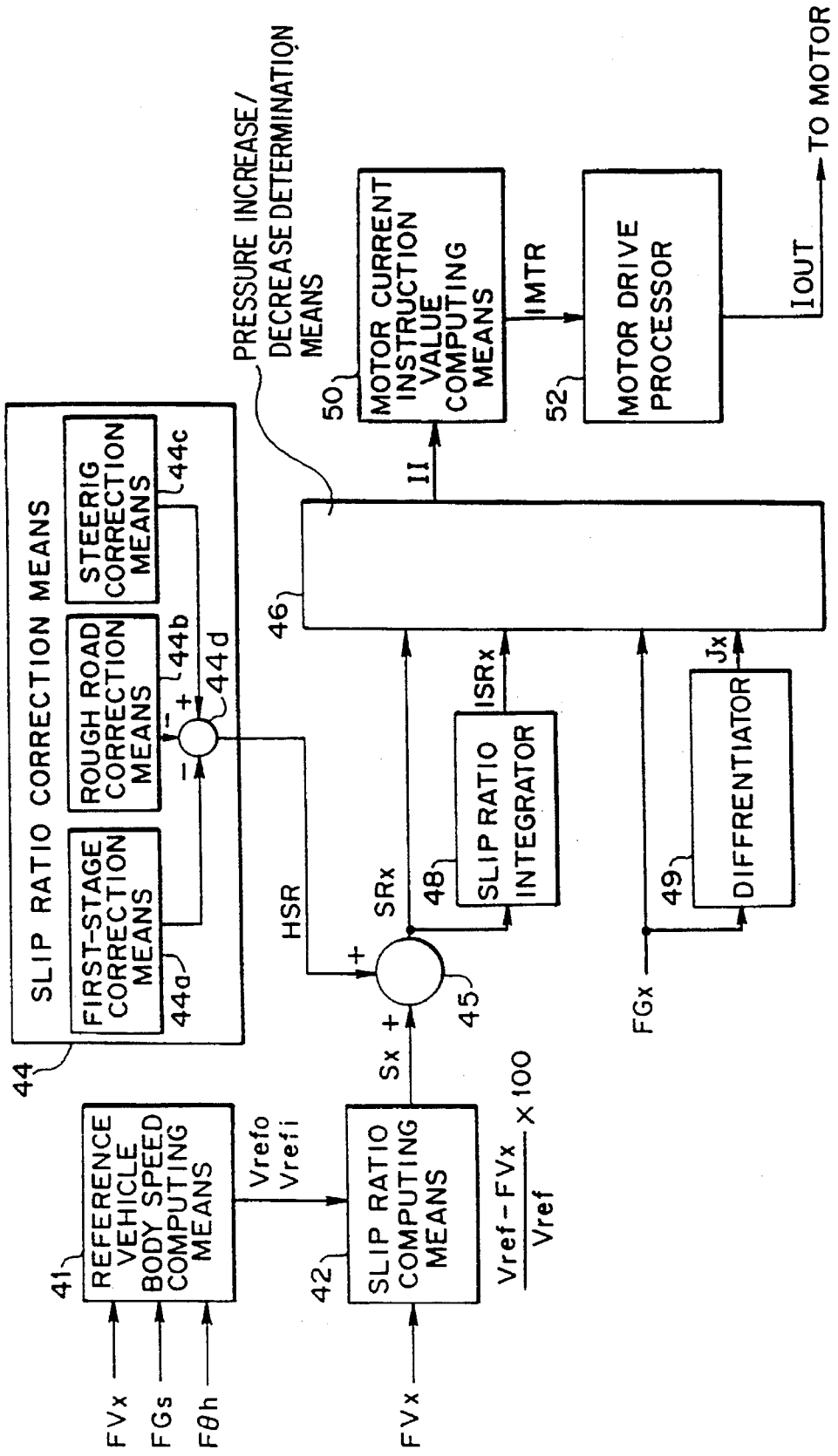
FIG. 4 is a functional block diagram of ABS control by the electronic control unit (ECU) 30 shown in FIG. 1.
Figure 5:
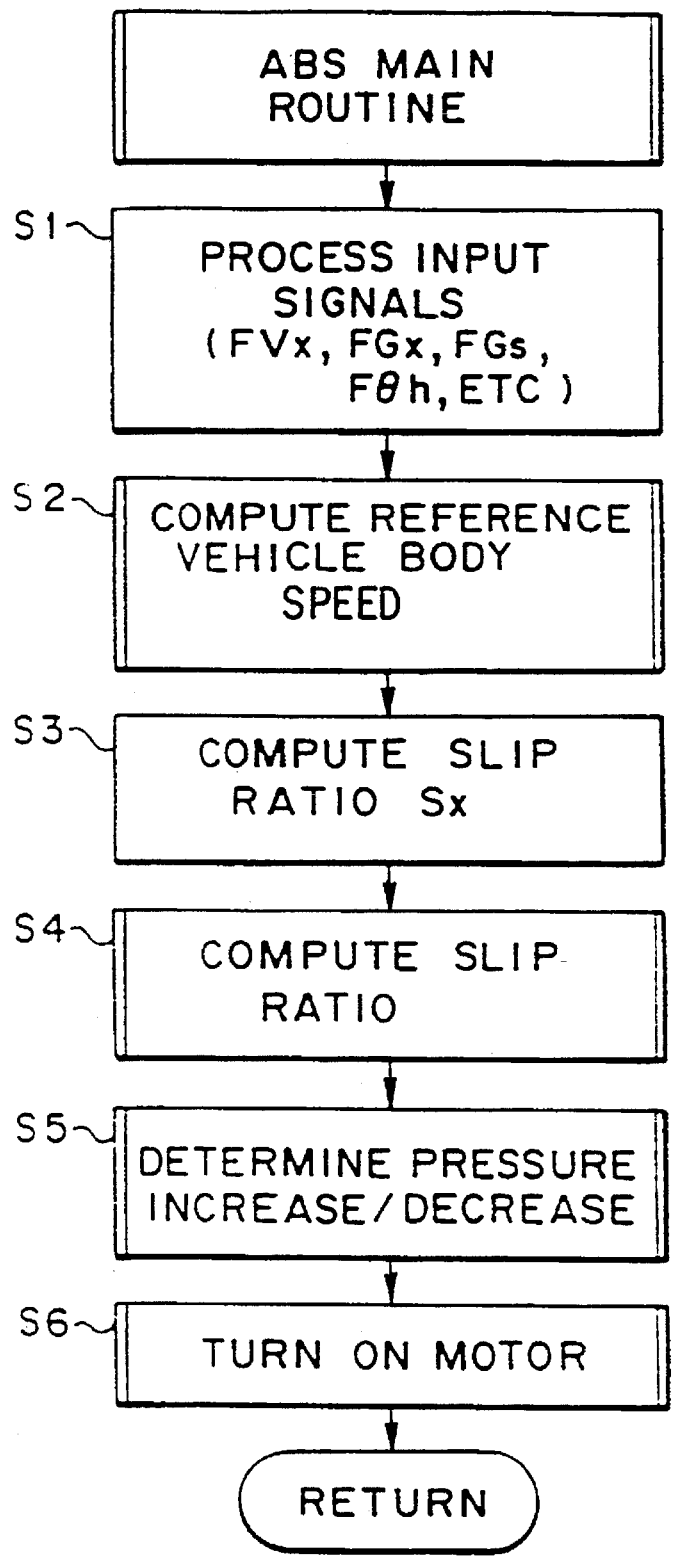
FIG. 5 is a flow chart of a main routine, illustrating procedures of the ABS control, which are performed by the electronic control unit (ECU) shown in FIG. 1.

FIGS. 3 and 4 show the functional block diagrams corresponding to the ABS control performed by the electronic control unit 30. These functional block diagrams will hereinafter be described with reference to the flow chart of the ABS main routine shown in FIG. 5.

ABS Main Routine

First, input signals detected by various sensors are processed by the sensor signal processors shown in FIG. 3 (Step S1). Wheel speed signals from the wheel speed sensors 21–24 are subjected to processing such as amplification, waveform processing, sampling and A/D conversion by the input processor 31 and, after high-frequency components are cut off by a filter 31a, are outputted as signals having magnitudes representing wheel speeds FVx of the respective wheels. The outputs from the filter 31a are also delivered to a differentiator 32, where wheel accelerations of the respective wheels are computed. High-frequency components of these values are cut off by a low-pass filter 33 and, after being corrected at correction means 34 by a longitudinal acceleration FGS detected by the longitudinal G sensor 26 to be described subsequently herein, are outputted as signals having magnitudes representing wheel accelerations FGx of the respective wheels. Here, it is to be noted that the suffix "x" as used in the wheel speeds FVx and the wheel accelerations FGx (also in the below-described slip ratios Sx of the respective wheels) represents the right front wheel 1R, the left front wheel 1L, the right rear wheel 2R and the left rear wheel 2L and also that, when wheel speeds and the like are referred to along with the suffix "x", the values of the respective wheels are separately computed.

The detection signal from the longitudinal G sensor 26 is subjected to processing such as amplification, waveform processing, sampling and the like by the input processor 35 and is then outputted as a raw datum GS of the longitudinal acceleration. In addition, the output of the input processor 35 is also fed to a lowpass filter 36 and, after its high-frequency component is cut off there, is also outputted as a filtered value FGS.

The detection signal from the steering angle sensor 25 is subjected to processing such as amplification, waveform processing and sampling by the input processor 37 and, after filtered by a low-pass filter 38, is outputted as a steering angle Fθh. This steering angle Fθh is differentiated with respect to time by a differentiator 39 and, after filtered by a low-pass filter 40, is outputted as a steering speed FDθh.

The wheel speed FVx, wheel acceleration FGx and steering angle Fθh, which have been subjected to the signal processing as described above, are next supplied to a reference vehicle body speed computing means 41 shown in FIG. 4, so that a reference vehicle body speed Vref is computed (Step S2). If the automotive vehicle is making a quick turn at this time and the absolute value of the steering angle Fθh is large, the reference vehicle body speed Vrefo of the outer wheels and the reference vehicle body speed Vrefi of the inner wheels are computed by correcting differential radii prescribed by the front and rear wheels during cornering. Although the vehicle speed on the side of the outer wheels and that on the side of the inner wheels differ from each other due to the differential radii, the slip ratio of each wheel can be correctly determined by correcting the difference in vehicle speed due to the differential radii.

The reference vehicle body speed Vref (Vrefo and Vrefi) computed by the reference vehicle body speed computing means 41 is supplied to slip ratio computing means 42 so that, based on the wheel speed FVx of each wheel and the reference vehicle body speed Vref, the slip ratio Sx of each wheel is computed in accordance with the following formula (S1) (Step S3):

$$Sx = (Vref - FVx)/Vref \times 100 \qquad (S1)$$

Slip ratio correcting means 44 is constructed of first-stage correction means 44a, rough road correction means 44b, steering correction means 44c and adder 44d. Correction values computed at these correction means 44a–44c are added at the adder 44d. Using added values HSR, the above slip ratios Sx are corrected (Step S4). These corrections are to prevent actuation of the ABS, for example, upon riding over a bump, to improve braking force and directional stability on a rough road and also to improve steerability upon making a quick turn.

Pressure increase/decrease determination means 46 is supplied with a slip ratio SRx corrected by the slip ratio correction means, an integral ISRx of the slip ratio SRx, a wheel acceleration FGx of each wheel, and a differential Jx of the wheel acceleration. It is then determined by fuzzy inference or the like whether the braking pressure is increased or not (Step S5). The computation of the integral ISRx is executed by a slip ratio integrator 48, while the computation of the differential Jx is performed by a differentiator 49.

Figure 6:
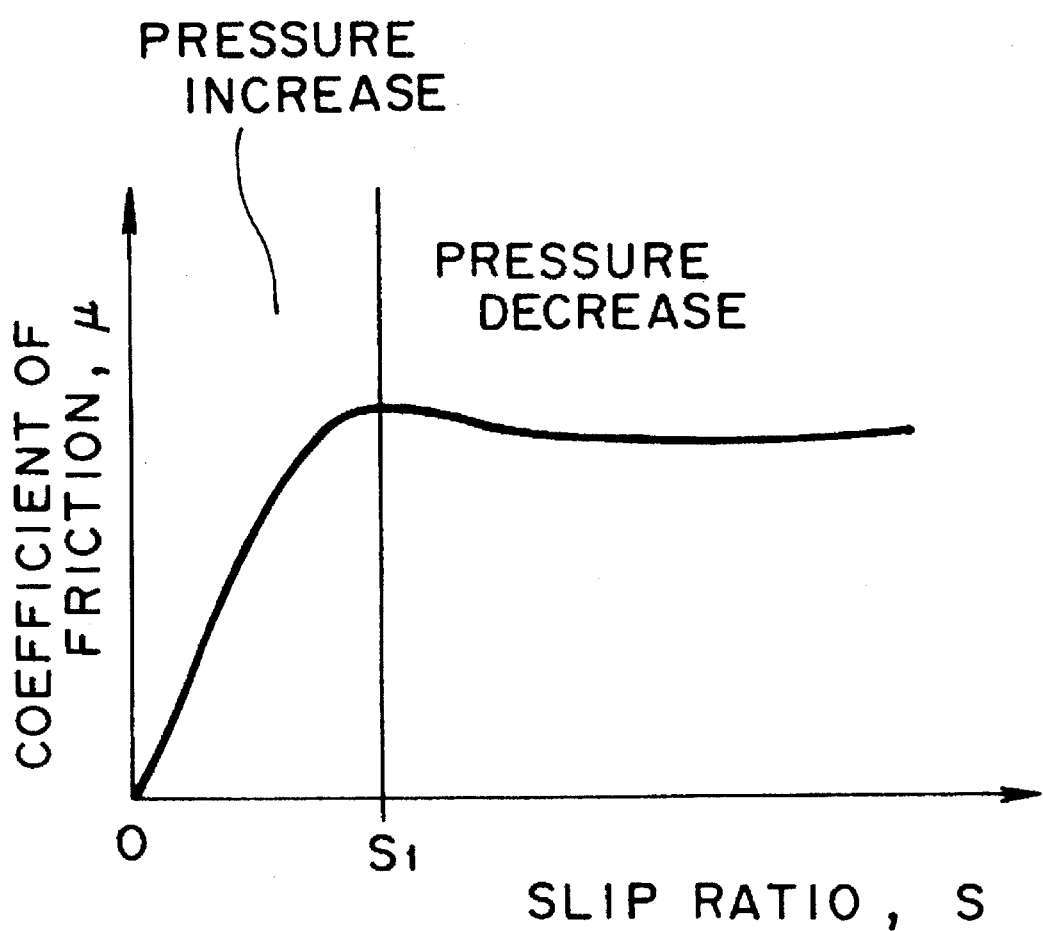
FIG. 6 is a graph illustrating a relationship between a slip ratio S and a friction coefficient μ.

FIG. 6 shows the relationship between the slip ratio S and the friction coefficient μ. As a general method of control by an ABS, based on the relationship between the slip ratio S and the friction coefficient μ and the wheel acceleration FGx, the pressure of brake fluid is increased when the slip ratio S is smaller than a value at which the friction coefficient becomes the greatest or tends to become smaller than the value S1, but is decreased when the slip ratio S is greater than the value S1 or tends to become greater than the value S1. Use of the wheel acceleration FGx alone, however, may result in the situation that the completion of control to lower the pressure would be delayed due to a delay in phase of the filter system for the sensors. To avoid this situation, the system of the present invention is designed to detect, in an earlier stage, any trend toward restoration of a higher wheel speed. The system of the present invention is also designed to detect, in an earlier stage, each extremely low μ-road from the integral ISRx of the slip ratio SRx and also each move toward a high μ-road from a low μ-road so that optimization of brake fluid pressure is ensured.

The results of determination of an increase or decrease at the pressure increase/decrease determination means 46 are outputted as a motor drive target value II to motor current instruction value computing means 50. The computing means 50 computes a motor drive current IMTR in accordance with prescribed procedures. Based on the thus-computed value IMTR, a motor drive processor 52 then outputs a drive current $I_{OUT}$ for the motor 16 of the hydraulic unit (HU) 10 (Step S6). In accordance with the computed value IMTR, the motor drive processor 52 controls to an optimal value the drive current $I_{OUT}$ to be supplied to the motor 16.

Determination of Pressure Increase/Decrease

Next, the pressure increase/decrease determination procedure (Step S5 in FIG. 5) in the present invention will be described in detail.

Figure 17:
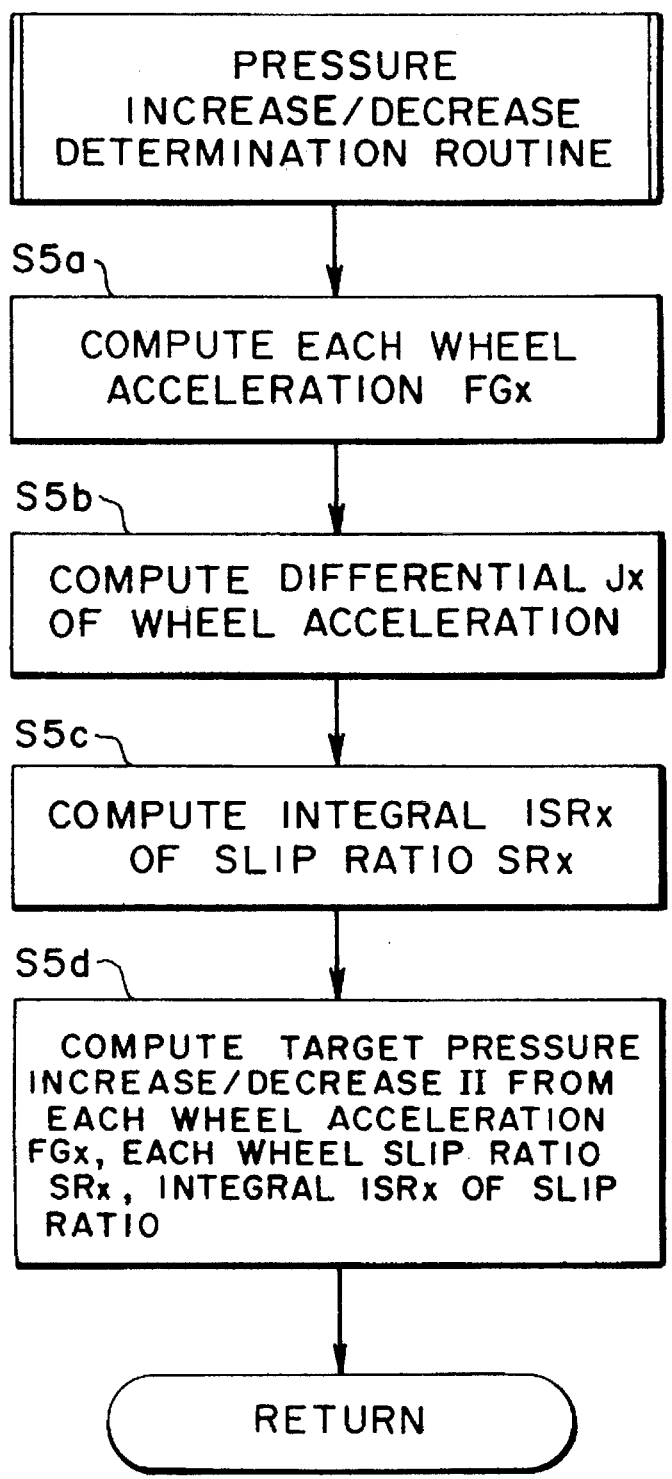
FIG. 17 is a flow chart showing procedures for the determination of a pressure increase or decrease, including integration of slip ratios and computation of braking force.

The determination of an increase or decrease in pressure is performed by steps constructed, for example, as shown in FIG. 17.

This step construction will now be described. First, at the differentiator (differentiation means) 32), the wheel speed FVx of each wheel is differentiated to calculate the wheel acceleration FGx of the wheel (Step S5a). At the differentiator 49, the wheel acceleration FGx of each wheel is differentiated to calculate the differential Jx of the wheel acceleration of each wheel (Step S5b). At the slip ratio integrator 48, a slip ratio integration step is executed by integrating the slip ratio SRx of each wheel so that the integral ISRx of the slip ratio of each wheel is calculated (Step S5c).

Next, by the pressure increase/decrease determination means 46, the step of calculating the target pressure increase/decrease II from the wheel acceleration FGx of each wheel, the slip ratio SRx of each wheel, the wheel acceleration differential Jx of each wheel and the slip ratio integral ISRx of each wheel, that is, the braking force computing step is executed (Step S5d).

In the braking force computing step described above, it may also be possible to calculate the target pressure increase or decrease II from the wheel acceleration FGx of each wheel, the slip ratio SRx of each wheel and the slip ratio integral ISRx of each wheel without taking into consideration the wheel acceleration differential Jx of each wheel. In this case, Step S5b for calculating the wheel acceleration differential Jx of each wheel is omitted.

The above procedures feature the slip ratio integration step and also the braking force computation step. Details of the slip ratio integration step will hereinafter be explained while describing details of determination of a pressure increase or decrease and computation of braking force by the braking force computing step.

Figure 7:
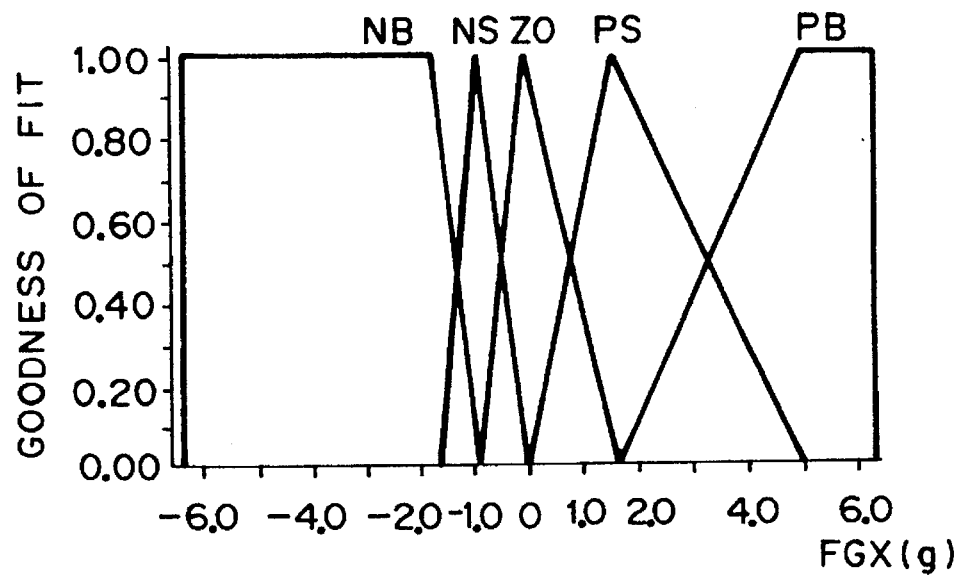
FIG. 7 is a diagrammatic representation of a membership function for wheel accelerations FGx, which membership function is used by an electronic control unit 30 for the determination of either a pressure increase or decrease.
Figure 8:
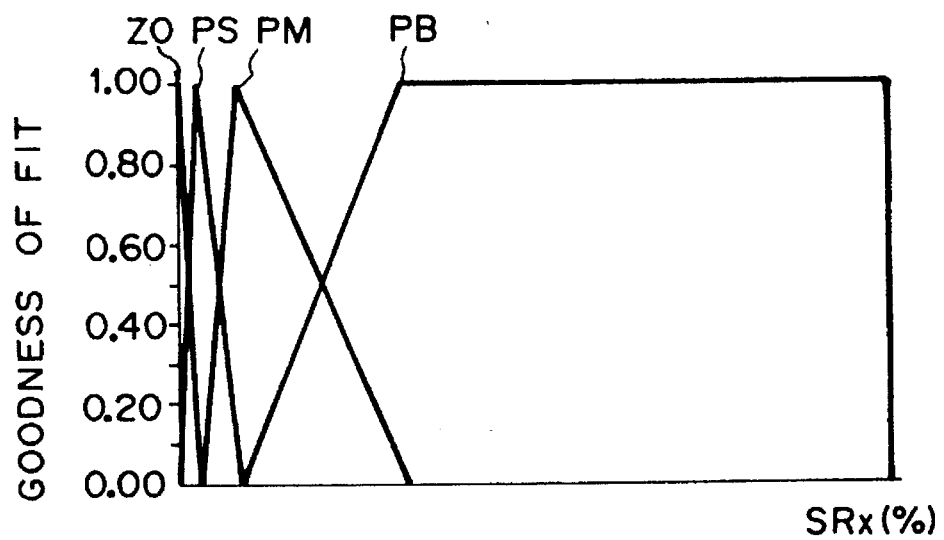
FIG. 8 is a diagrammatic representation of a membership function for slip ratios SRx, which membership function is used by the electronic control unit 30 for the determination of either a pressure increase or decrease.
Figure 9:
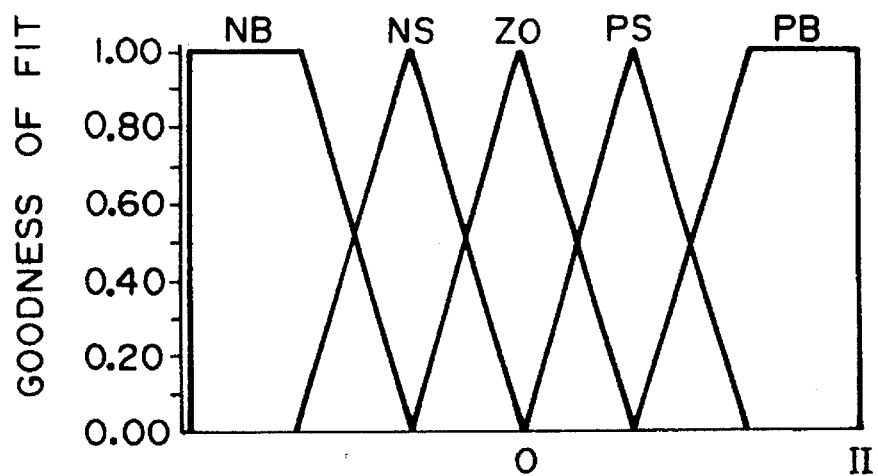
FIG. 9 is a diagrammatic representation of a membership function for target pressure increases or decreases II, which membership function is used by the electronic control unit 30 for the determination of either a pressure increase or decrease.

Especially, the determination of an increase or decrease of the hydraulic brake pressure in this embodiment is conducted by a fuzzy inference which basically makes use of the slip ratio SRx and the wheel acceleration FGx as inputs. A description will first be made of this basic fuzzy inference. The three sets of membership functions shown in FIG. 7 through FIG. 9 are stored in a memory of the electronic control unit 30. FIG. 7 shows the membership function for the wheel acceleration FGx of each wheel as a fuzzy input variable. FIG. 8 illustrates the membership function for the slip ratio SRx of each wheel as another fuzzy input variable. FIG. 9 depicts the membership function which is relied upon to obtain a target pressure increase or decrease II as an output. In these functions, PB designates positive big, PM positive medium, PS positive small, Z0 zero, NB negative big, and NS negative small.

The set of twenty basic rules shown in Table 1 are also stored in the memory of the electronic control unit 30.

TABLE 1

| | | (Jx ≠ PB, ISRx ≠ PB & ISRx ≠ NB) | | | |
|---|---|---|---|---|---|
| | | Slip ratio SRx | | | |
| | | ZO | PS | PM | PB |
| Wheel | PB | PB | PB | PS | PS |
| acceleration | PS | PS | PS | ZO | ZO |
| FGx | ZO | PS | PS | ZO | NS |
| | NS | PS | ZO | NS | NB |
| | NB | ZO | NS | NB | NB |

Some of the basic fuzzy rules shown in Table 1 will be exemplified below.

If FGx=NB and SRx=PB, then II=NB.
  (If the wheel acceleration FGx is NB and the slip ratio SRx is PB, the target pressure increase or decrease II is NB.)

If FGx=Z0 and SRx=PS, then III=PS.
  (If the wheel acceleration FGx is Z0 and the slip ratio SRx is PS, the target pressure increase or decrease II is Ps).

The set of rules in the above table are valid when the wheel acceleration differential Jx is not PB, the slip ratio integral ISRx is not PB and the slip ratio integral ISRx is not NB, with the wheel acceleration differential Jx, slip ratio integral ISRx and wheel acceleration differential Jx yet to be described herein.

By the known MAX-MIN method and gravity center method, for example, the electronic control unit 30 computes the target pressure increase or decrease II of each wheel which corresponds to the wheel acceleration FGx and slip ratio SRX so computed. Namely, with respect to one of the rules, in accordance with the computed wheel acceleration FGx and slip ratio SRx of each wheel, the corresponding goodnesses of fit are determined from FIGS. 7 and 8. The target pressure increase or decrease corresponding to the smaller grade of goodness membership of the two goodness of fit so determined (the MIN method) is then determined from FIG. 9. The target pressure increase or decrease II is likewise determined with respect to all of the twenty rules. The individual target pressure increases or decreases II determined for the respective rules are then caused to overlap to determine their contour (the MAX method). From the center of gravity of a pattern surrounded by the contour so determined, the target pressure increase or decrease II is finally determined (the gravity center method).

In the fuzzy inference described above, the target increase or decrease II was determined based on the wheel acceleration FGx and the slip ratio SRx. Use of the fuzzy theorem for the determination of a pressure increase or decrease makes it possible to use many inputs without the need for limiting inputs to such two inputs as described above, in other words, to set conditions for the determination. This permits precise control of a pressure increase or decrease, so that the accuracy of the control is improved and hydraulic-pressure-dependent variations of the hydraulic brake pressure are hence decreased. Accordingly, vibrations and noise are reduced, leading to better riding comfort.

If the control is carried out, for example, on the basis of the wheel acceleration FGx alone, the determination of the ending time point of pressure-decreasing control may be delayed due to a delay in phase of a filter system which is employed to process input signals. Use of a differential of an acceleration FGx which is advanced in phase than the wheel acceleration FGx, that is, a wheel acceleration differential Jx as an additional fuzzy input variable makes it possible to obviate such a delay, thereby permitting detection of a recovering tendency of the wheel speed at an early stage.

Figure 10:
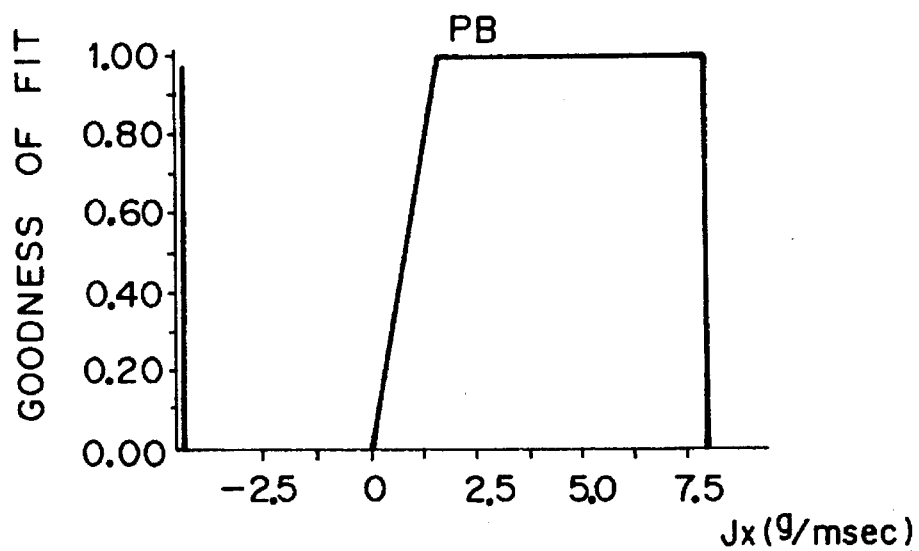
FIG. 10 is a diagrammatic representation of a membership function for vehicle acceleration differentials Jx, which membership function is used by the electronic control unit 30 for the determination of either a pressure increase or decrease.

FIG. 10 depicts the illustrative membership function set relative to wheel acceleration differentials Jx as an additional fuzzy input variable. Table 2 presents a set of rules which are added when the wheel acceleration differential Jx is PB.

TABLE 2

|  |  | (Jx = PB) | | | |
|---|---|---|---|---|---|
|  |  | Slip ratio SRx | | | |
|  |  | ZO | PS | PM | PB |
| Wheel | PB |  |  |  |  |
| acceleration | PS |  |  |  |  |
| FGx | ZO |  |  |  | ZO |
|  | NS |  |  | ZO | ZO |
|  | NB |  | ZO | ZO | ZO |

The followings are examples of fuzzy rules when a fuzzy inference is executed using the wheel acceleration differential Jx as an additional fuzzy input variable.

If FGx=NB, SRx=PB and Jx≠PB, then II=NB.
  (If the wheel acceleration FGx is NB, the slip ratio SRx is PB and the wheel acceleration differential Jx is not PB, the target pressure increase or decrease II is NB in view of Table 1.)

If FGx=NB, SRx=PB and Jx=PB, then II=Z0.
  (If the wheel acceleration FGx is NB, the slip ratio SRx is PB and the wheel acceleration differential Jx is PB, the target pressure increase or decrease II is Z0 in view of Table 2).

Figure 11A:
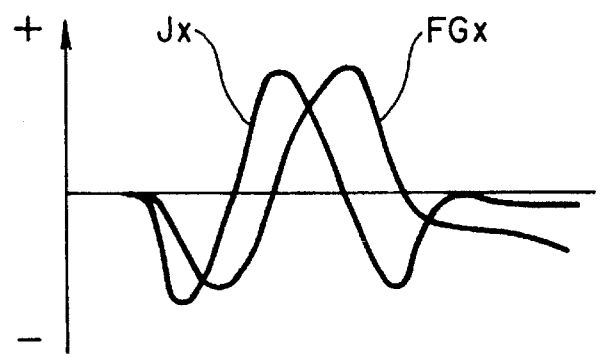
FIGS. 11(a), FIG. 11(b) and FIG. 11(c) are diagrammatic representations showing wheel accelerations FGx and wheel acceleration differentials Jx, reference vehicle body speeds Vref and wheel speeds FVx, and hydraulic brake pressures, all as a function of time, respectively.
Figure 11B:
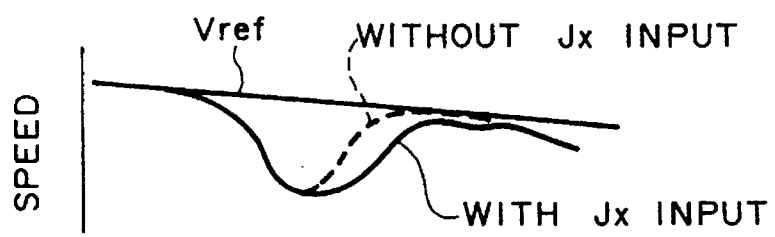
Figure 11C:
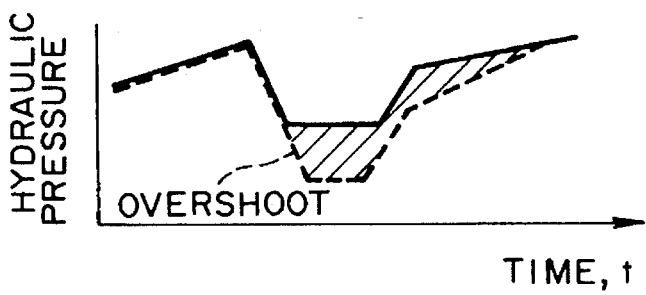

The use of the wheel acceleration differential Jx as an additional input variable in the fuzzy inference makes it possible, as shown in FIG. 11, to detect an increasing tendency of the wheel acceleration FGx earlier by ¼ phase owing to the wheel acceleration differential Jx [see FIG. 11(a)], so that an excessive decrease (overshoot) of the hydraulic brake pressure can be prevented correspondingly.

Figure 12:
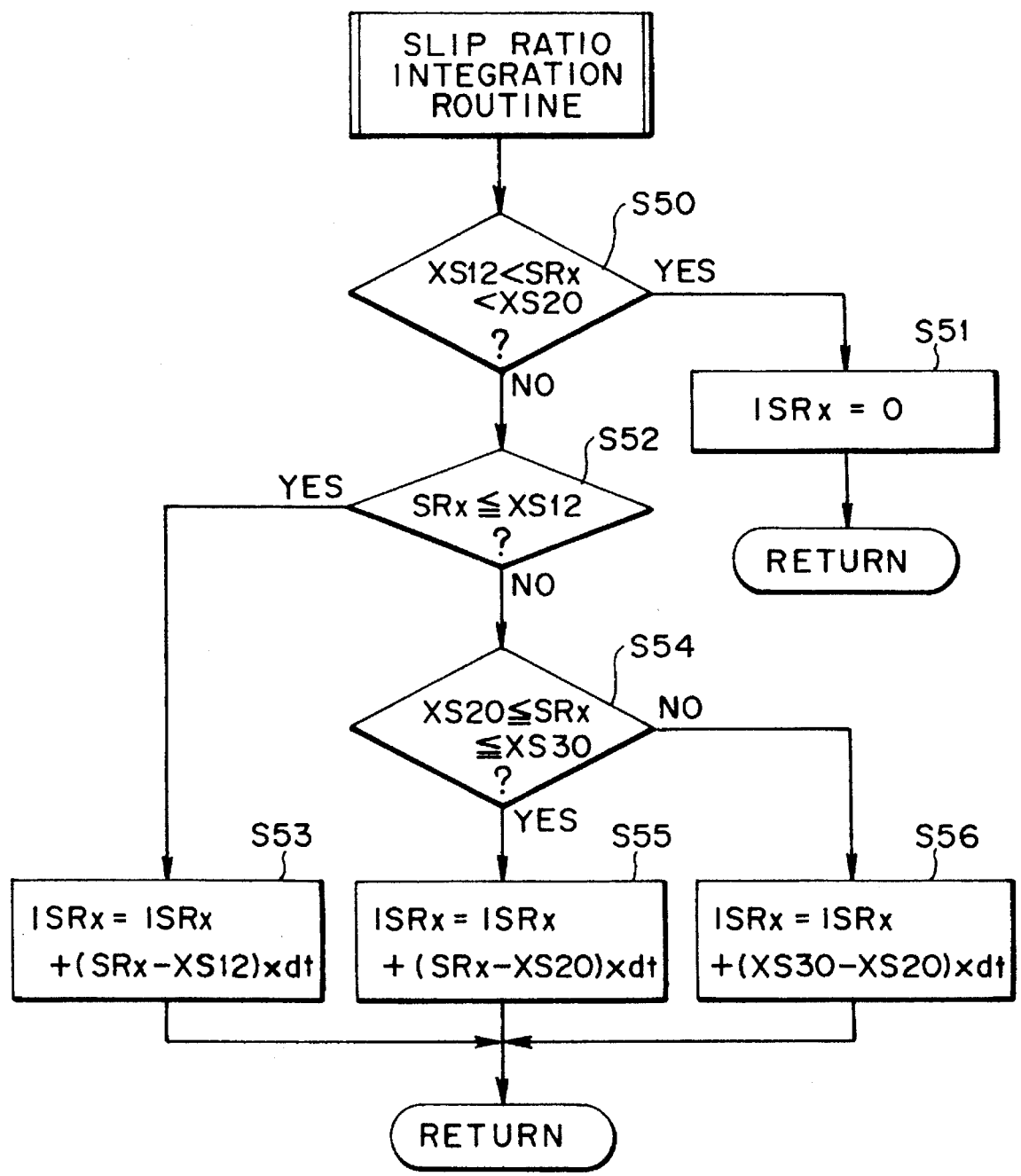
FIG. 12 is a flow chart of a slip ratio integration routine, which is executed by the electronic control unit 30.

In addition, use of the integral ISRx of the slip ratio SRx as a further additional fuzzy input variable permits detection of running on an extremely low-μ road or advance from a low-μ road to a high-μ road at an early stage. The integral ISRx is computed for this purpose (see Step S5c of FIG. 17). Procedures of its computation will next be described with reference to FIG. 12 and FIG. 13.

The electronic control unit 30 first finds in Step S50 whether the slip ratio SRx of each wheel is a value within a predetermined range of from XS12 to XS20 (for example, 12–20%) or not. If the slip ratio SRx is determined to fall within the predetermined range of from XS12 to XS20, a wheel cylinder for the wheel is considered to be supplied with hydraulic brake pressure sufficient to produce maximum friction. In such a case, it is unnecessary to detect the above-mentioned situation of running on an extremely low-μ road or an advance from a low-μ road to a high-μ road. The routine then advances to Step S51, where the integral ISRx is reset to 0 to complete the routine. As long as the results of the determination in Step S50 are affirmative (t1 to t2, t5 to t6, and t7 to t8 in FIG. 13), Step S51 is repeatedly executed and the integral ISRx is maintained at 0.

When the results of the finding in Step S50 is negative, on the other hand, the routine then advances to Step S52 so that it is determined whether the slip ratio SRx is not greater than the above-mentioned predetermined value XS12. If the results of the determination are affirmative, the routine advances to step S53 to compute the integral ISRx in accordance with the following formula (SS1):

$$ISRx=ISRx+(SRx-XS12)\,dt \qquad (SS1)$$

Figure 13:
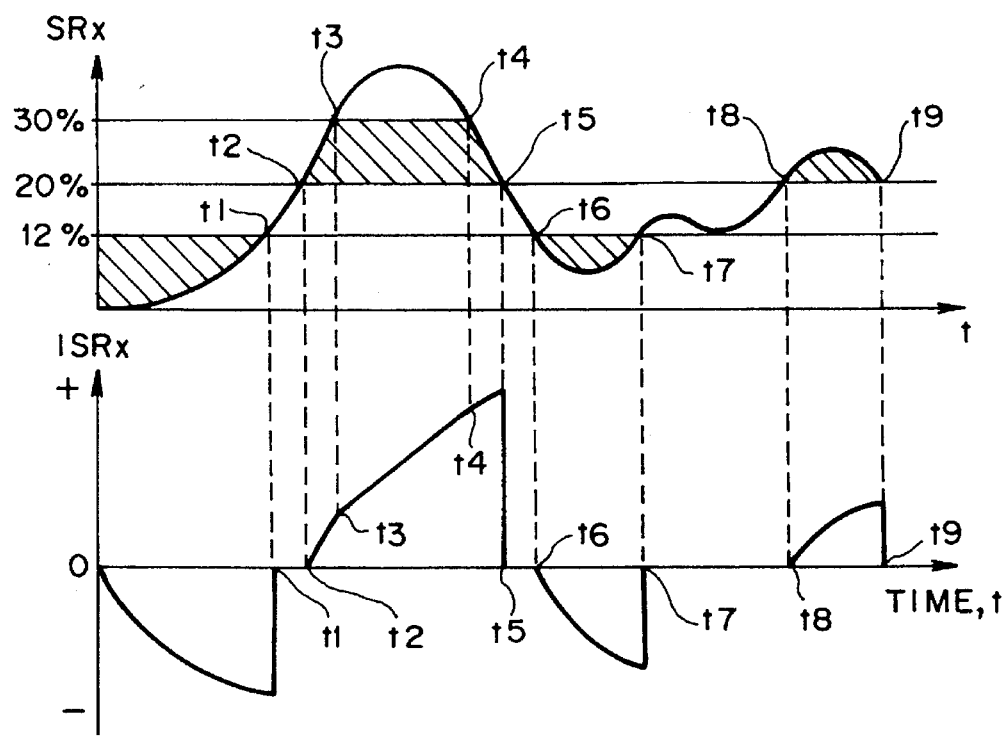
FIG. 13 is a diagrammatic representation showing slip ratios SRx and slip ratio integrals ISRx, which are obtained by integrating the slip ratio SRx, as a function of time.

At this time, the integral ISRx so computed takes a negative value as is also evident from FIG. 13 (before t1 and t6 to t7 in FIG. 13).

When the value of SRx is not smaller than the predetermined value XS20 but is not greater than the predetermined value XS30 (for example 30%), the results of the determination in Step S54 are affirmative. In such a case, Step S55 is executed to compute the integral ISRx in accordance with the following formula (SS2):

$$ISRx=ISRx+(SRx-XS20)\,dt \qquad (SS2)$$

Here, the integral ISRx so computed takes a positive value as is also apparent from FIG. 13 (t2 to t3, t4 to t5, and t8 to t9 in FIG. 13). When the value of SRx is greater than the predetermined value XS30 (30%), the results of the determination in Step S54 are negative. In such a case, Step S56 is executed to compute the integral ISRx in accordance with the following formula (SS3):

$$ISRx=ISRx+(XS30-XS20)\,dt \qquad (SS3)$$

At this time, the integral :ISRx so computed takes a positive value as is also readily envisaged from FIG. 13 but a constant value (XS30–XS20) dt is added (between t3 and t4 in FIG. 13). This computation is to prevent the integral ISRx from becoming too large. Upon running on an extremely low-μ road, a wheel may be brought toward a locked state while the wheel acceleration FGx is still small (ZO). The above routine is to detect such a state by finding out whether the integral ISRx is PB (positive big) or not.

Figure 14:
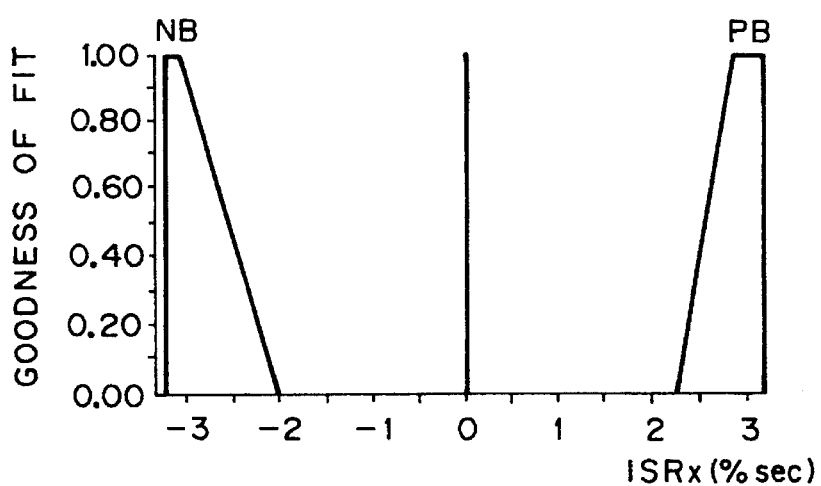
FIG. 14 is a flow chart 0f a slip ratio integration routine, which is executed by the electronic control unit 30.

FIG. 14 shows the illustrative membership function set for slip ratio integrals ISRx as an additional fuzzy input variable. Table 3 presents a set of rules which are added when the slip ratio integral ISRx is PB.

TABLE 3

|  |  | (ISRx =0 PB) | | | |
|---|---|---|---|---|---|
|  |  | Slip ratio SRx | | | |
|  |  | ZO | PS | PM | PB |
| Wheel | PB |  |  |  |  |
| acceleration | PS |  |  |  |  |
| FGx | ZO |  |  | NS | NB |
|  | NS |  |  | ZB |  |
|  | NB |  |  |  |  |

The followings are examples of fuzzy rules when the slip ratio integral ISRx is PB.

If FGx=ZO, SRx=PM, ISRx≠NB and ISRx≠PB, then II=ZO.
  (If the wheel acceleration FGx is ZO, the slip ratio SRx is PM and the slip ratio integral ISRx is neither NB nor PB, the target pressure increase or decrease II is ZO in view of Table 1.)

If FGx=ZO, SRx=PM and ISRx=PB, then II=NS.

(If the wheel acceleration FGx is ZO, the slip ratio SRx is PM and the slip ratio integral ISRx is PB, the target pressure increase or decrease II is NS in view of Table 3.)

The use of the slip ratio integral ISRx as an additional input variable in the fuzzy inference makes it possible, as is illustrated in FIG. 15(a), to detect each time-dependent variation of the slip ratio integral ISRx as a large value even if the slip ratio SRx undergoes small time-dependent variations. Incidentally, the slip ratio integral ISRx represents the length of a period in which the slip ratio SRx has been controlled outside the appropriate range described above. When a state of large slip ratios is judged to have continued for a long time from a variation in the slip ratio integral ISRx, control of the hydraulic brake pressure toward a lower pressure makes the wheel speed FVx change from the curve 2 to the curve 1, that is, approach the vehicle body speed Vref as illustrated in FIG. 15(b). It is therefore possible to avoid the phenomenon that a wheel is gradually brought toward a locked state on an extremely low-μ road.

Table 4, on the other hand, illustrates a set of rules to be added when the slip ratio integral ISRx is NB.

TABLE 4

|  |  | (ISRx = NB) | | | |
|---|---|---|---|---|---|
|  |  | Slip ratio SRx | | | |
|  |  | ZO | PS | PM | PB |
| Wheel acceleration FGx | PB PS ZO NS NB |  |  | PB PB PB PB |  |

The followings are examples of fuzzy rules when the slip ratio integral ISRx is NB.

If FGx=ZO, SRx=PM, ISRx≠NB, and ISRx≠PB, then II=ZO.
  (If the wheel acceleration FGx is ZO, the slip ratio SRx is PM and the slip ratio integral ISRx is neither NB nor PB, the target pressure increase or decrease II is ZO in view of Table 1.)

If FGx=ZO, SRx=PM and ISRx=NB, then II=PB.
  (If the wheel acceleration FGx is ZO, the slip ratio SRx is PM and the slip ratio integral ISRx is NB, the target pressure increase or decrease II is PB in view of Table 4).

The use of the slip ratio integral ISRx as an additional input variable in the fuzzy inference makes it possible, as is illustrated in FIG. 16(a), to detect each advance from a low-μ road to a high-μ road because the slip ratio integral ISRx becomes much smaller than 0 (ISRx<<0). By accelerating a rise of the fluid brake pressure from the curve 6 to the curve 5 as shown in FIG. 16(c), the wheel speed FVx is reduced earlier as indicated by numeral 4 on the curve 3 in FIG. 16(b). Owing to the difference between the actual vehicle body speed and the wheel speed FVx, frictional force is hence effectively produced between the road surface and the tire and braking is hence effected. The driver is therefore prevented from the feeling of idle-running.

In the embodiment described above, the motor direct-driven hydraulic unit (HU) 10 is arranged in the hydraulic line between each wheel cylinder and the master cylinder to control the hydraulic brake pressure. Needless to say, the application of the present invention is not limited to the use of such a hydraulic unit.

What is claimed is:
1. A method for controlling a brake force applied to a wheel of a vehicle comprising the steps of:
   determining a value of a slip ratio of the wheel;
   determining a value of an acceleration of the wheel;
   adding a first predetermined value to the determined slip ratio value for determining a corrected slip ratio value if the determined slip ratio value exceeds a predetermined range of slip ratio values, the first predetermined value being based on a difference between the determined slip ratio value and a predetermined limit of the predetermined range of slip ratio values; and
   integrating the difference between the determined slip ratio value and the predetermined limit of the predetermined range of slip ratio values;
   controlling the brake force applied to the wheel so that the determined slip ratio value is changed to be within the predetermined range of slip ratio values, the brake force being controlled based on the corrected slip ratio value and the determined acceleration value when the integrated determined slip ratio value is at least equal to a second predetermined value and the determined acceleration value is less than a third predetermined value.

2. A method according to claim 1, wherein the predetermined range of slip ratio values includes a maximum value of slip ratio and the determined corrected slip ratio value is greater than the maximum value of slip ratio, and the step of controlling reduces the braking force applied to the wheel.

3. A method according to claim 2, wherein when the difference between the determined slip value and the predetermined range of slip ratio values is greater than a fourth predetermined value, the first predetermined value equals the fourth predetermined value.

4. A method according to claim 1, wherein the predetermined range of slip ratio values includes by a minimum value of slip ratio and the determined slip ratio value is less than the minimum value of slip ratio, and the step of controlling increases the brake force applied to the wheel.

5. A method according to claim 1, further comprising the step of setting the integrated determined slip ratio value to zero when the determined slip ratio value is changed to be within the predetermined range of slip ratio values.

6. A method according to claim 1, wherein the step of controlling is based on a membership function relating a goodness of fit of the corrected slip ratio value, a goodness of fit of the determined acceleration value and a goodness of fit of the integrated determined slip ratio value as input variables to a set of fuzzy rules.

7. A method according to claim 6, wherein the set of fuzzy rules comprises a first rule for when the integrated determined slip ratio value is a large value and a second rule for when the integrated determined slip ratio value is a small value; and
   wherein the first rule defines a relationship between the corrected slip ratio value, the determined acceleration value and the integrated determined slip ratio value which provides a greater change of the brake force for changing the slip ratio back to be within the predetermined range of slip ratio values than a change in the brake force provided by the second rule.

8. An anti-skid braking system for controlling a brake force applied to a wheel, comprising:
   slip ratio computing means for outputting a first signal having a magnitude based on a determined slip ratio of the wheel;
   wheel acceleration computing means for outputting a second signal having a magnitude based on an acceleration value of the wheel;

integrating means, coupled to the slip ratio computing means, for integrating a difference between the magnitude of the first signal and a predetermined range of magnitudes when the difference exceeds a first predetermined value and for outputting a third signal having a magnitude based on the integrated difference; and a controller, coupled to the slip ratio computing means, the wheel acceleration computing means and the integrating means, for controlling the brake force applied to the wheel so that the magnitude of the first signal is changed to be within the predetermined range of magnitudes, the controller controlling the brake force based on the magnitudes of the first and second signals when the magnitude of the third signal is at least equal to a second predetermined value and the magnitude of the second signal is less than a third predetermined value.

9. An anti-skid brake system according to claim 8, wherein when the magnitude of the third signal is greater than a predetermined maximum value, the controller reduces the brake force applied to the wheel.

10. An anti-skid brake system according to claim 9, wherein when the difference between the magnitude of the first signal and the predetermined range of magnitudes is greater than a fourth predetermined value, the integrating means integrates the fourth predetermined value in place of the difference.

11. An anti-skid brake system according to claim 8, wherein when the third signal is less than a predetermined minimum value, the controller increases the brake force applied to the wheel.

12. An anti-skid brake system according to claim 8, wherein when the magnitude of the first signal is within the predetermined range of magnitudes, the magnitude of the third signal is set to zero.

13. An anti-skid brake system according to claim 8, wherein the controller controls the brake force based on a membership function relating a goodness of fit of the slip ratio of the wheel, a goodness of fit of the acceleration of the wheel and a goodness of fit of the integrated corrected first signal as input variables to a set of fuzzy rules.

14. An anti-skid brake system according to claim 13, wherein the set of fuzzy rules comprise a first rule for when the magnitude of the third signal is a large value and a second rule for when the magnitude of the third signal is a small value; and wherein the first rule defines a relationship between the slip ratio of the wheel, the acceleration of the wheel and the integrated corrected first signal which provides a greater change of the brake force for changing the magnitude of the first signal to be within the predetermined range of magnitudes than provided by the second rule.

\* \* \* \* \*